(12) United States Patent
McNab et al.

(10) Patent No.: US 11,935,560 B2
(45) Date of Patent: Mar. 19, 2024

(54) HARD DISK DRIVE MULTIPLE CONTACT DISK CLAMP

(71) Applicant: Western Digital Technologies, Inc., San Jose, CA (US)

(72) Inventors: Robert McNab, San Jose, CA (US); Rasool Koosha, Austin, TX (US); Mukesh Patel, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/135,065

(22) Filed: Apr. 14, 2023

(65) Prior Publication Data
US 2023/0352048 A1    Nov. 2, 2023

Related U.S. Application Data

(60) Provisional application No. 63/335,661, filed on Apr. 27, 2022.

(51) Int. Cl.
*G11B 19/20*    (2006.01)
*G11B 17/038*    (2006.01)

(52) U.S. Cl.
CPC ........ *G11B 19/2009* (2013.01); *G11B 17/038* (2013.01)

(58) Field of Classification Search
CPC . G11B 17/038; G11B 25/043; G11B 17/0287; G11B 17/0282; G11B 19/2009; G11B 17/02; G11B 23/0035; G11B 17/0284; G11B 33/08; G11B 17/03; G11B 17/022; G11B 17/028; G11B 19/2045; G11B 17/032; G11B 33/121; G11B 17/043; G11B 17/0434; G11B 17/035; G11B 17/0288; G11B 19/2036; G11B 23/0308
See application file for complete search history.

(56) References Cited

U.S. PATENT DOCUMENTS 5,031,062 A      7/1991  Wood et al.
5,452,157 A  *   9/1995  Chow .................. G11B 25/043
                                                  360/99.12

(Continued)

OTHER PUBLICATIONS

Kim, Woochul et al., Optimal disk clamp design to minimize stress variation of disks in a hard disk drive, Journal of Mechanical Science and Technology, Manuscript Received Jun. 22, 2008; Revised Apr. 30, 2009; Accepted May 27, 2009; vol. 23 (2009) 2645-2651, KSME & Springer.

*Primary Examiner* — Brian E Miller
(74) *Attorney, Agent, or Firm* — John D. Henkhaus

(57) ABSTRACT

A disk clamp for a hard disk drive, configured to clamp disk media to a spindle, includes multiple protrusions extending from a surface of a bottom side and configured to contact a disk medium at multiple contact positions in response to application of a clamping load. The protrusions may be annular protrusions circumscribing a disk clamp hub, where the height of an inner protrusion may be less than the height of an outer protrusion to inhibit coning of the top disk medium, and the protrusions may be positioned so that an equivalent contact radius corresponding to contact radii of the inner and outer annular protrusions is at a position halfway between the inner and outer diameters of the disk spacers to inhibit coning of the middle disk media.

11 Claims, 11 Drawing Sheets

(56) References Cited

U.S. PATENT DOCUMENTS

| | | | |
|---|---|---|---|
| 5,490,024 A * | 2/1996 | Briggs | G11B 17/038 360/99.12 |
| 5,517,376 A | 5/1996 | Green | |
| 5,596,462 A * | 1/1997 | Smith | G11B 17/02 360/99.12 |
| 5,600,512 A * | 2/1997 | Radwam | G11B 17/038 |
| 5,768,052 A * | 6/1998 | Smith | G11B 17/038 360/99.08 |
| 5,828,519 A | 10/1998 | Sasa | |
| 5,912,784 A | 6/1999 | Bronshvatch et al. | |
| 6,172,844 B1 * | 1/2001 | Luo | G11B 17/02 |
| 6,195,234 B1 * | 2/2001 | Sundaram | G11B 23/0035 |
| 6,414,817 B1 * | 7/2002 | Luo | G11B 17/038 |
| 6,462,902 B1 * | 10/2002 | Luo | G11B 17/038 360/99.12 |
| 6,724,568 B1 | 4/2004 | Suwito et al. | |
| 6,816,338 B1 * | 11/2004 | Suwito | G11B 17/0287 360/99.12 |
| 7,215,509 B2 | 5/2007 | Ng | |
| 7,307,813 B1 * | 12/2007 | Suwito | G11B 17/0287 360/98.08 |
| 8,077,432 B2 * | 12/2011 | Hanlon | G11B 17/0287 360/99.08 |
| 2002/0024762 A1 * | 2/2002 | Renken | F16F 15/36 |
| 2002/0034041 A1 * | 3/2002 | Luo | G11B 17/02 360/99.12 |
| 2005/0135225 A1 * | 6/2005 | Feliss | G11B 17/038 369/127 |
| 2006/0132976 A1 * | 6/2006 | Lee | G11B 23/0035 |
| 2007/0035876 A1 * | 2/2007 | Engesser | G11B 17/0284 360/99.12 |
| 2007/0133124 A1 | 6/2007 | Kim et al. | |

\* cited by examiner

HARD DISK DRIVE MULTIPLE CONTACT DISK CLAMP

FIELD OF EMBODIMENTS

Embodiments of the invention may relate generally to hard disk drives, and particularly to approaches to a disk clamp.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

Increasing the storage capacity of hard disk drives (HDDs) is one of the on-going goals of HDD technology evolution. In one form, this goal manifests in increasing the number of disks implemented in a given HDD. However, oftentimes maintaining a standard form factor is required, as characterized in part by the z-height of an HDD, which inherently provides challenges with respect to fitting more disks into a given HDD. More particularly, customer specifications and/or common design and operational constraints include operational shock (or "op-shock") requirements, which generally relate to an HDD's operational tolerance of a mechanical shock event. As the number of disks in a given form factor is increased, the disk stack clamping load (i.e., screw tension loads) increases commensurately to adequately hold the disk stack together, especially in view of the op-shock requirements. Thus, it remains a challenge to increase the number of disks while maintaining a standard form factor, which consequently decreases the distance between each disk of the disk stack, while also reliably meeting op-shock requirements.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to a disk clamp configured to inhibit disk coning are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that as the number of disks in a given form factor is increased to increase storage capacity, the disk stack clamping load increases commensurately, especially in view of hard disk drive op-shock requirements. Consequently, such a large clamping load produces a substantial coning deformation in the disks which can adversely affect the read and write process above an acceptable tolerance.

Figure 1:
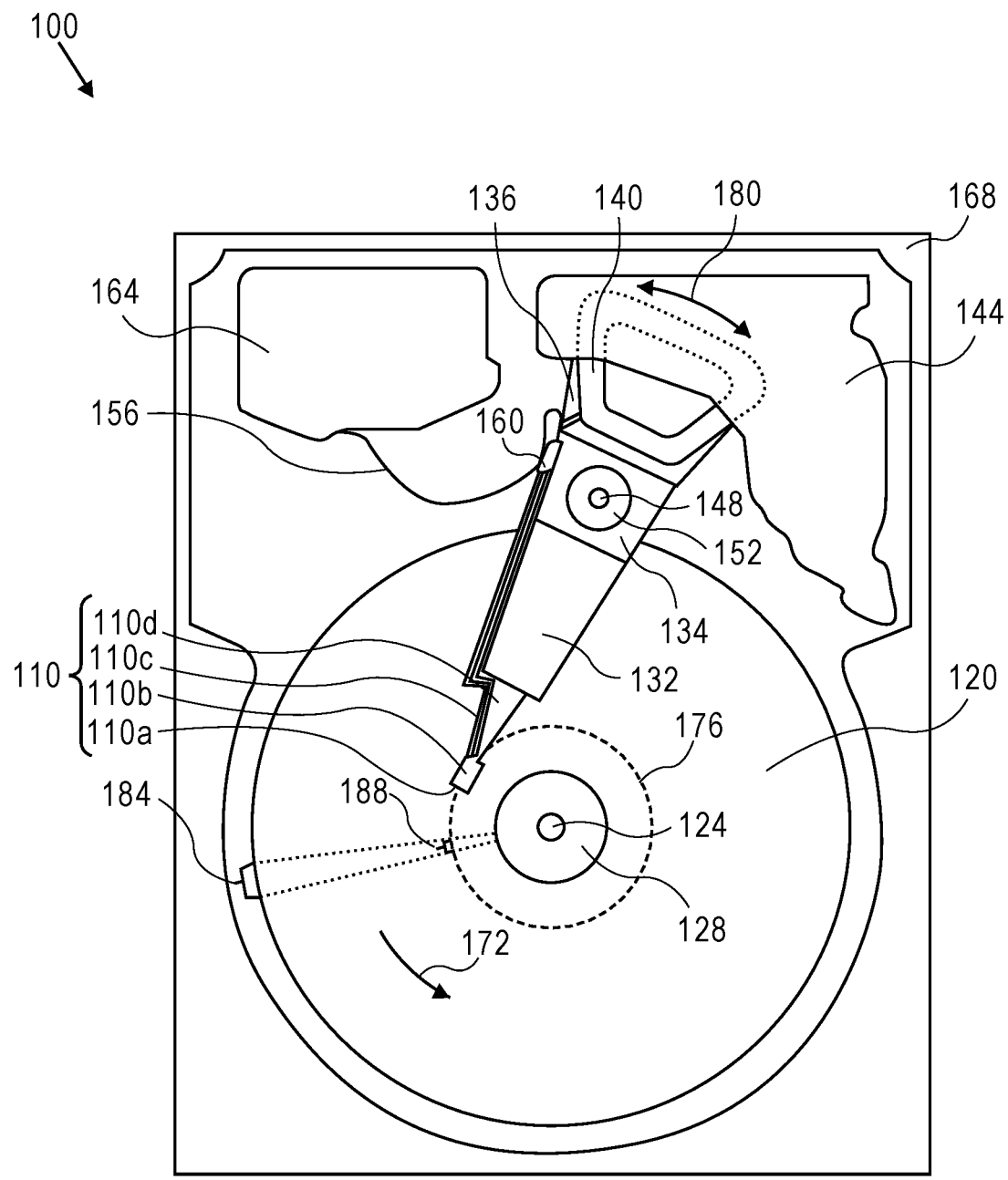
FIG. 1 is a plan view illustrating a hard disk drive, according to an embodiment.
Figure 2:
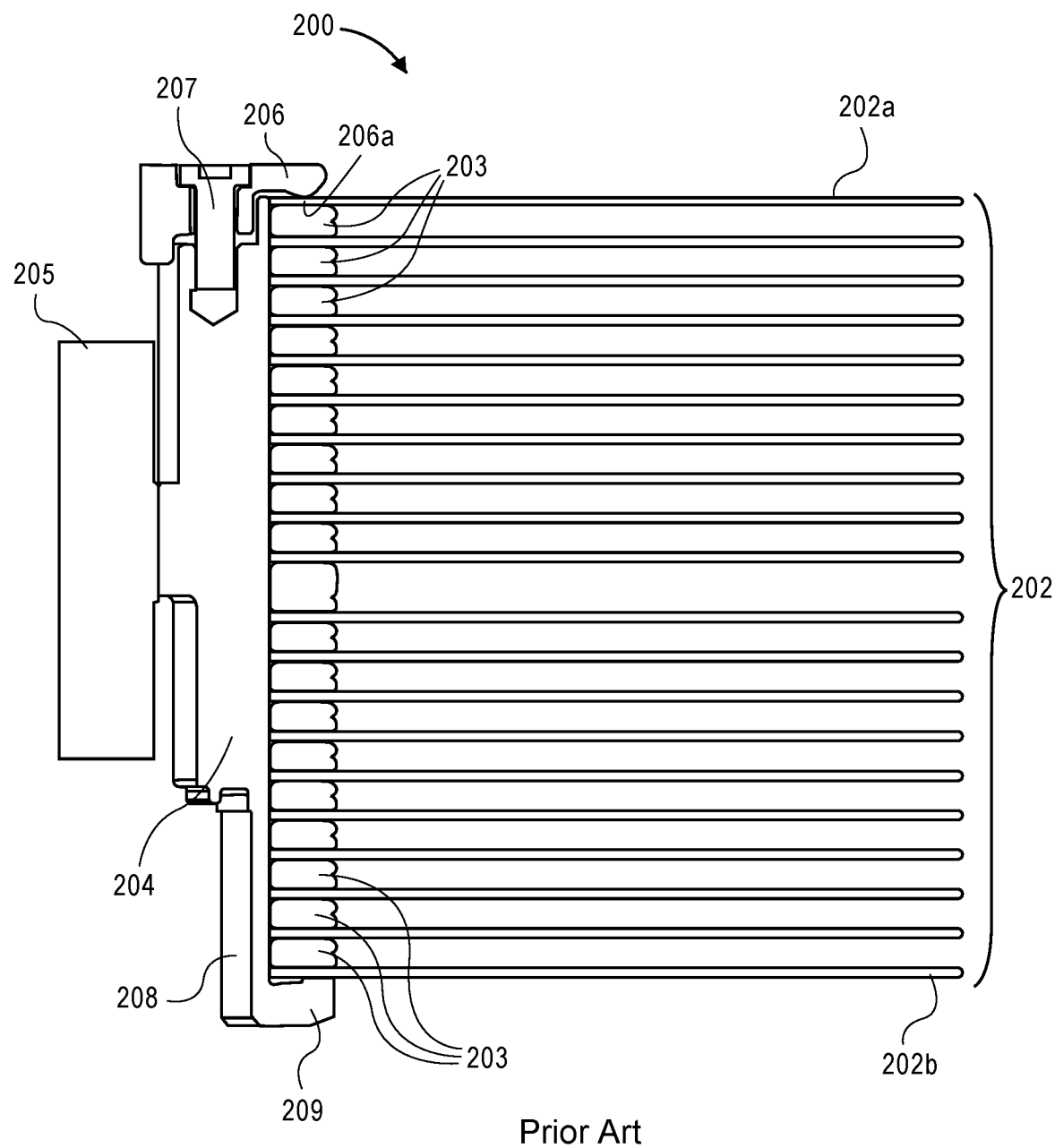
FIG. 2 is a cross-sectional side view illustrating a hard disk drive recording disk stack.

FIG. 2 is a cross-sectional side view illustrating a hard disk drive recording disk stack. Disk stack 200 comprises a plurality of disk media 202 rotatably mounted on, secured to, coupled with, clamped to a disk spindle 204 (see also spindle 124 of FIG. 1), which is typically part of a spindle drive motor 205 (shown here in simplified form) comprising the spindle hub 208 and hub flange 209. Disk stack 200 further comprises a plurality of disk spacers 203 interposed between adjacent disk media of the plurality of disk media 202. Depicted here is an example corresponding to a 2-inch high form factor hard disk drive (HDD) utilizing twenty (20) disk media 202. A single-contact disk clamp 206 having a single contact point 206a (or contact surface) is coupled to the spindle 204 to apply a clamping force or load to the stack of disk media 202 and disk spacers 203 to secure the disk media 202 to the spindle hub 208 so that the disk media 202 and disk spacers 203 rotate with the hub 208, whereby the disk clamp 206 is fastened to the spindle 204 using a circular series of fasteners 207 (e.g., typically threaded screws). The term "spindle" may refer generally to the rotating hub (e.g., hub 208), and everything affixed to rotate with the hub, such as the disk clamp (e.g., disk clamp 206) and what it clamps (e.g., disk media 202 and disk spacers 203).

Similarly, a single-contact hub flange 209 having a single contact point or contact surface, in conjunction with the disk clamp 206, applies the clamping force or load to the stack of disk media 202 and disk spacers 203. Conventional designs typically hold a single line of annular contact between the disk clamp 206 (or clamp hub) and the disk media 202, and a single line of annular contact between the hub flange 209 and the disk media 202. Hence, the disk media 202 at the top (top disk medium 202a) and at the bottom (bottom disk medium 202b) of the disk pack 200 largely deform and cone away from the point of contact.

Figure 3:
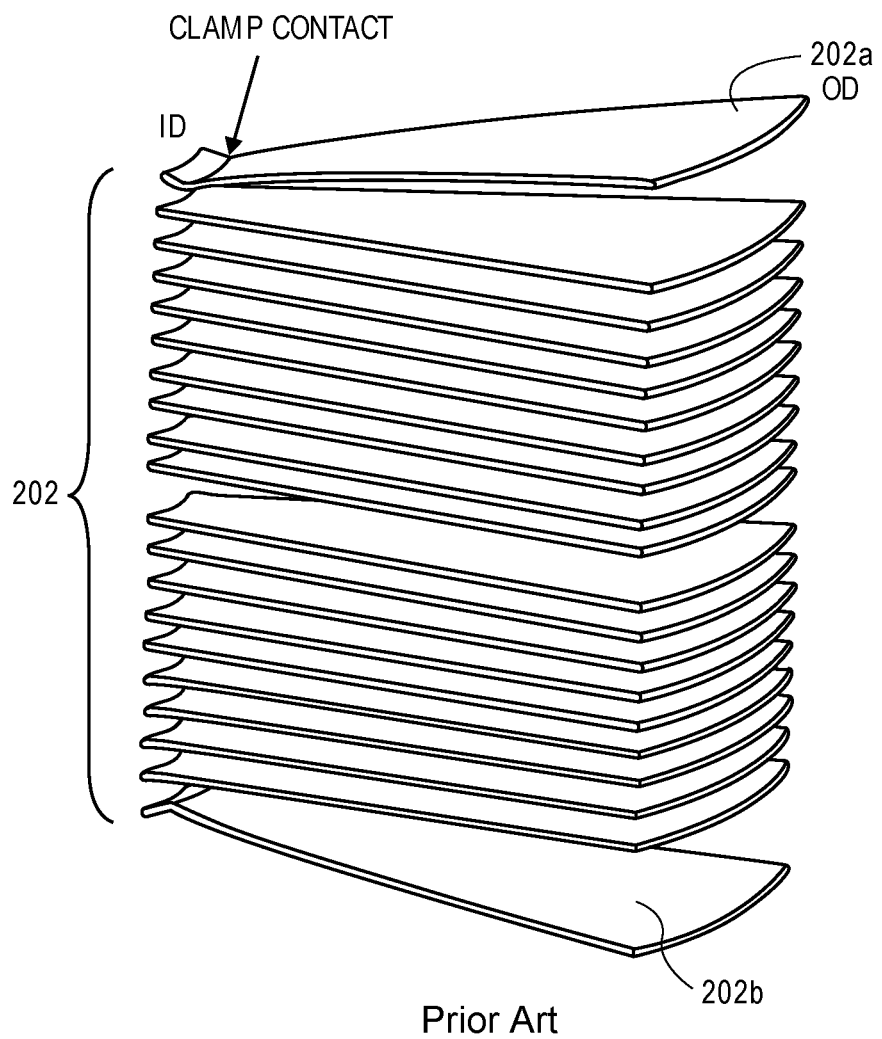
FIG. 3 is a perspective view illustrating the axial deformation of the recording disks in a disk stack with a single contact disk clamp under a moderate screw load, according to an embodiment.

FIG. 3 is a perspective view illustrating the axial deformation of the recording disks in a disk stack with a single contact disk clamp under a moderate screw load, according to an embodiment. To maintain clarity, FIG. 3 is a depiction of just a sliver of the disk media 202 of disk stack 200 (e.g., a 30° sliver of the disk stack is depicted here, rather than the full 360° of the disk stack), showing how the disk media 202 are likely to deform (e.g., also referred to "coning") under a nominal or designated clamping load (i.e., screw tension loads) from the single-contact disk clamp 206. Note here how the top or clamp-facing, clamp-contacting disk medium 202a deforms under the clamping load, by increasingly deflecting upward from its inner diameter (ID) to its outer diameter (OD), outboard of where the disk clamp 206 is in contact with the disk medium 202a. In this example 2-inch HDD design, the coning is significantly worse than with a common 1-inch form factor HDD design, as the clamping load needed to secure the additional disk media (e.g., from 10 disks to 20 disks) is commensurate with the number of disks. Stated otherwise, the clamping load needed to secure 20 disk media is roughly twice that needed to secure 10 disk media.

Multiple Contact Disk Clamp

A multiple contact disk clamp for a hard disk drive (HDD) includes multiple contact points or surfaces (generally, "contacts") between the disk clamp and the top disk (e.g., an end disk), where an inner contact and an outer contact are radially offset and the inner contact is intentionally axially offset from the outer contact through an optimization process. Such an optimization process is intended to determine the optimum offset for the inner contact that keeps the top disk relatively, substantially flat and also produces an equivalent contact force of the two contacts substantially at the mid-radius (or "halfway") of the spacers between the disks. Stated otherwise, the optimized disk clamp of the described embodiments is intended to inhibit the coning of the top disk with which the disk clamp is in contact, while also inhibiting the coning of the middle disks, i.e., the disks other than the end disks.

Figure 4B:
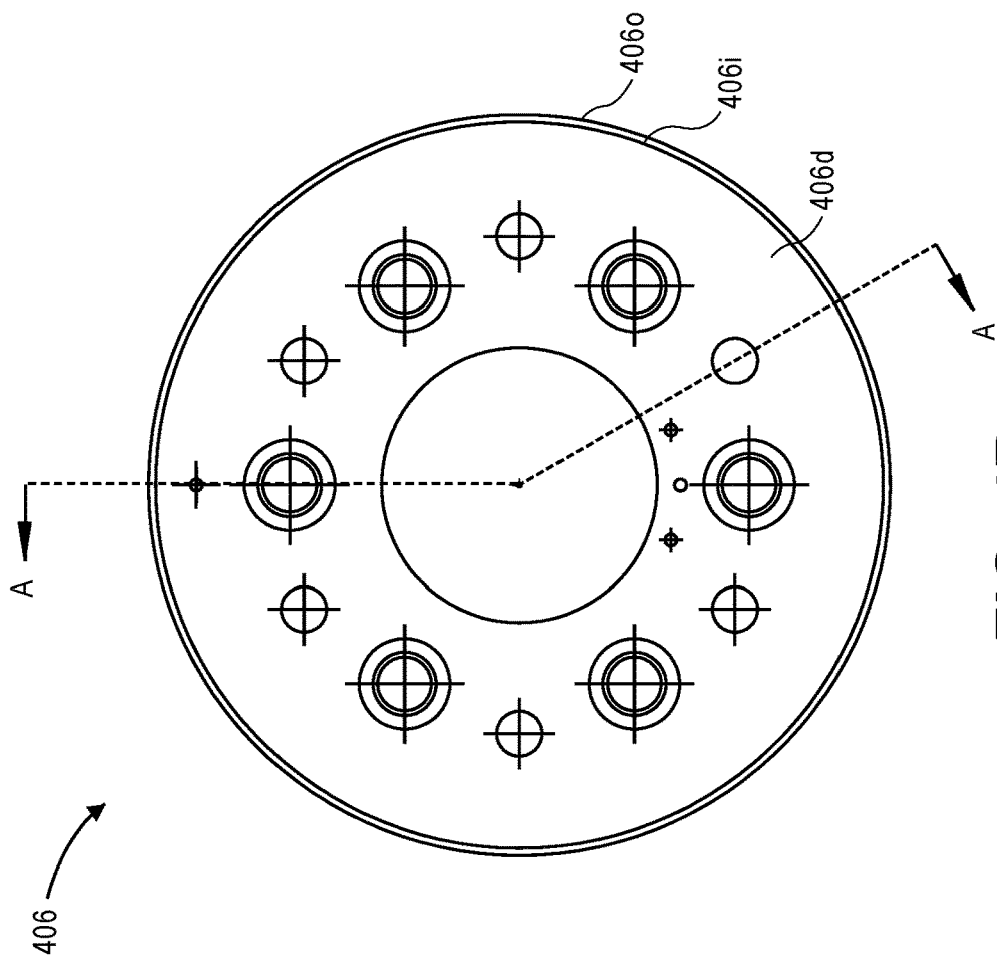
FIG. 4B is a bottom plan view illustrating the multiple contact disk clamp of FIG. 4A, according to an embodiment.
Figure 4A:
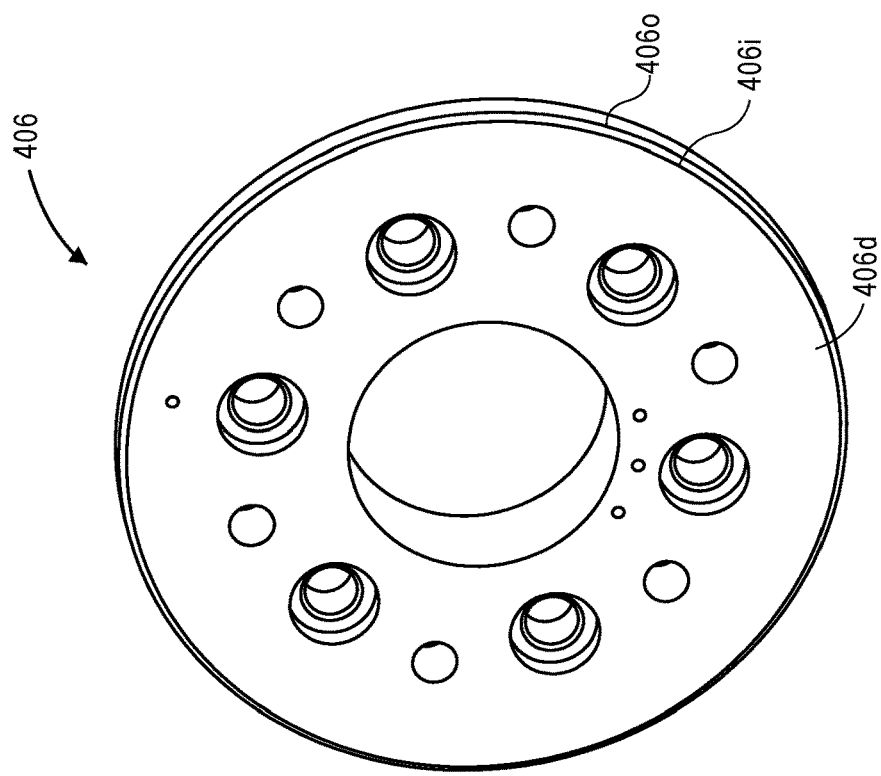
FIG. 4A is a bottom perspective view illustrating a multiple contact disk clamp, according to an embodiment.
Figure 4C:
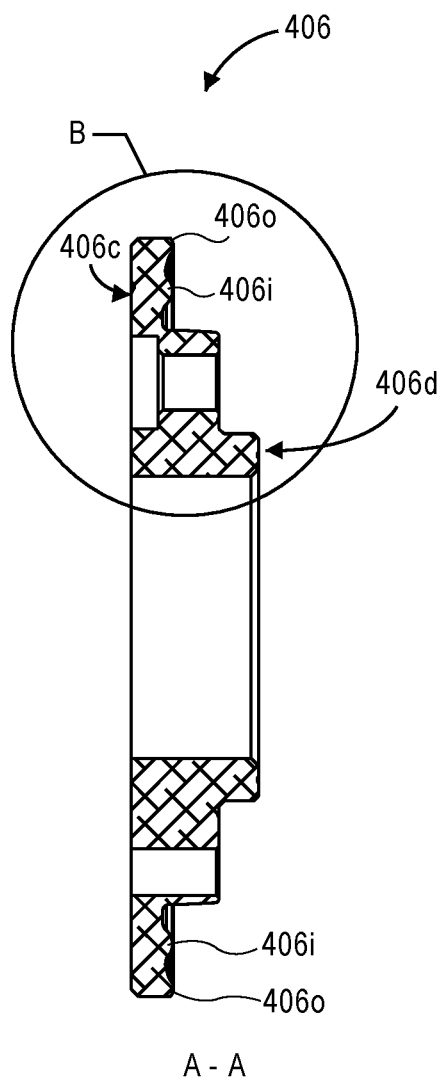
FIG. 4C is a cross-sectional view illustrating the multiple contact disk clamp of FIG. 4A, according to an embodiment.
Figure 4D:
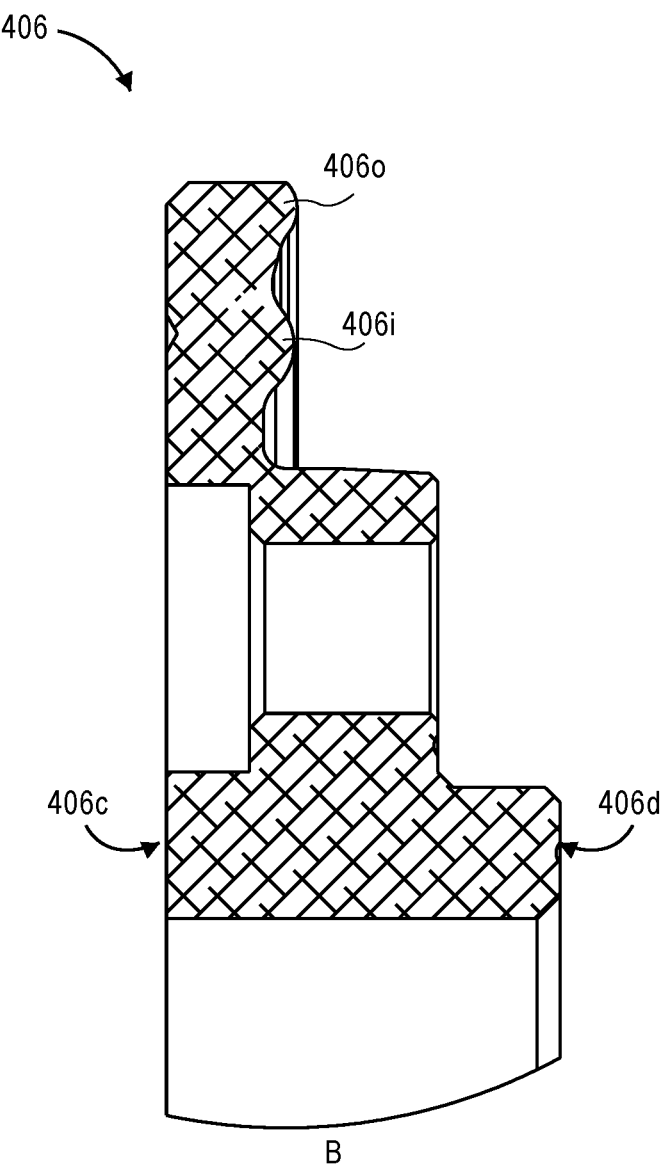
FIG. 4D is a magnified cross-sectional view illustrating the multiple contact points of the disk clamp of FIG. 4A, according to an embodiment.

FIG. 4A is a bottom perspective view illustrating a multiple contact disk clamp, FIG. 4B is a bottom plan view illustrating the multiple contact disk clamp of FIG. 4A, FIG. 4C is a cross-sectional view illustrating the multiple contact disk clamp of FIG. 4A, and FIG. 4D is a magnified cross-sectional view illustrating the multiple contact points of the disk clamp of FIG. 4A, all according to embodiments. Disk clamp 406 (or simply "clamp 406") is configured to clamp disk media to a spindle, such as to clamp a disk stack such as disk media 202 (FIGS. 2-3) to a spindle of a drive motor such as spindle 204 (FIG. 2) of spindle drive motor 205 (FIG. 2).

Disk clamp 406 comprises a disk-facing side 406d (or "bottom side") and a cover-facing side 406c (or "top side"), and multiple protrusions 406i, 406o extending from a surface of the disk-facing side 406d. Two protrusions 406i (inner), 406o (outer) are depicted here and found suitable for the described purpose, however, the number of protrusions may vary from implementation to implementation. The protrusions 406i, 406o are configured to contact a disk medium such as end or top disk medium 202a (FIGS. 2-3) in response to application of a clamping load (or clamping force), such as by way of a series of circumferentially-spaced fasteners or screws (see, e.g., screw 207 of FIG. 2), at multiple respective contact positions of the disk medium. According to an embodiment, each of the protrusions 406i, 406o is configured as an annular protrusion circumscribing a hub of the disk clamp 406, as depicted here, at a distance d apart from each other.

Figure 5:
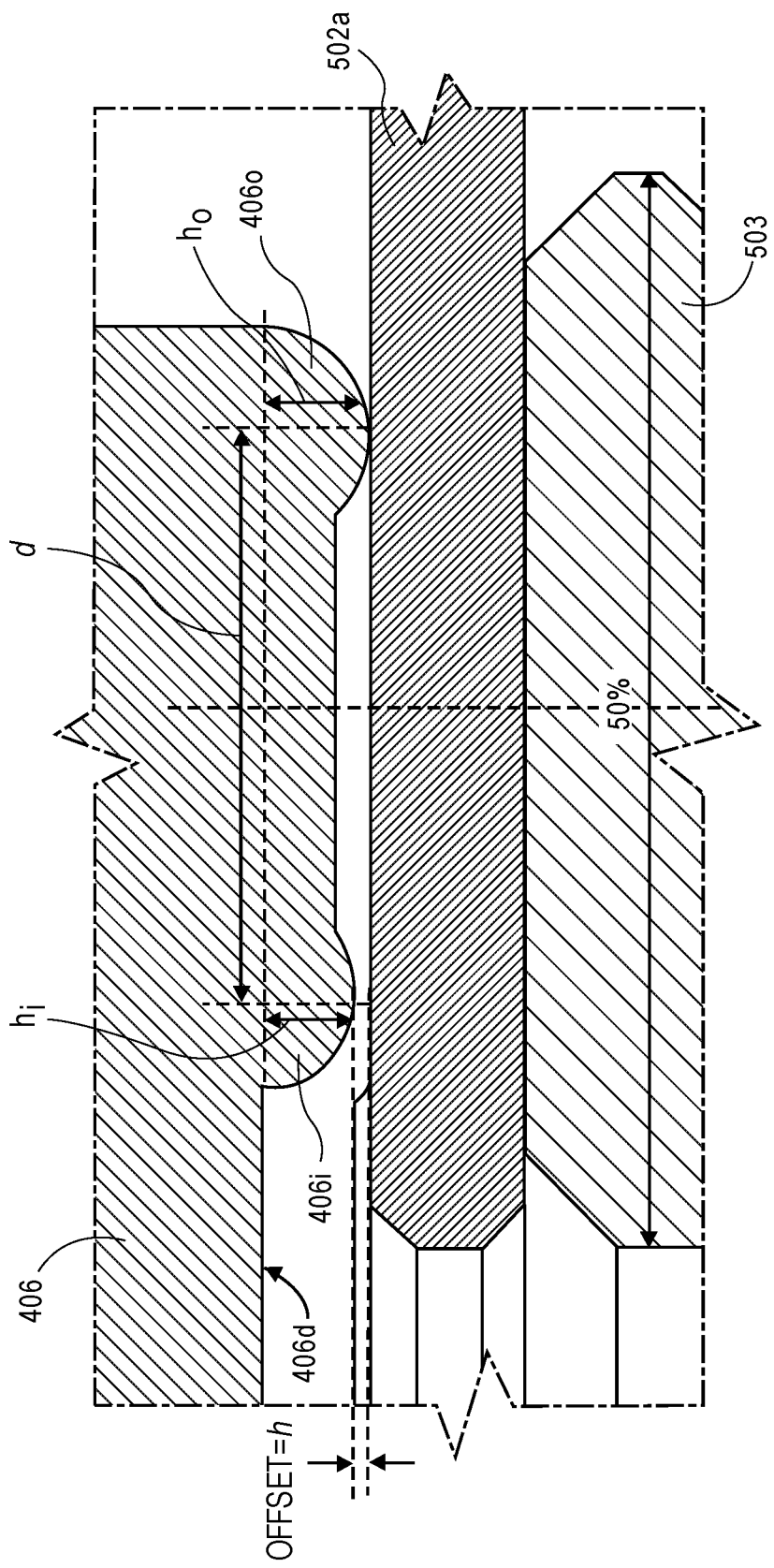
FIG. 5 is a magnified cross-sectional view illustrating design geometry for a multiple contact disk clamp, according to an embodiment.

FIG. 5 is a magnified cross-sectional view illustrating design geometry for a multiple contact disk clamp, according to an embodiment. As previously introduced, disk clamp 406 is preferably designed to optimize the axial offset (e.g., vertical, in context of the view of FIG. 5) for the inner contact corresponding to inner protrusion 406i relative to the outer contact corresponding to outer protrusion 406o, that keeps the top disk medium 502a substantially flat, or relatively flat in the context of comparing FIG. 6 (dual-contact disk clamp such as 406 of FIGS. 4A-4D) with FIG. 3 (single-contact disk clamp such as 206 of FIG. 2). Thus, the inner protrusion 406i has a first height at its centerline ("center height $h_i$") and the outer protrusion 406o has a second center height $h_o$, where the first center height $h_i$ of inner protrusion 406i is less than the second center height $h_o$ of outer protrusion 406o, with this axial offset referred to as offset h ($h=h_o-h_i$). The parameter h may vary from implementation to implementation and indeed is expected to vary based on specific design configurations and, therefore, represents an optimization goal. For example, if the inner contact axial offset is zero (h=0 mm) then the contact forces are entirely concentrated on the inner contact of inner protrusion 406i, as the outer protrusion 406o loses contact with the disk medium as the clamping load is applied by tightening the fasteners. By utilizing an offset h, the inner protrusion 406i is initially not in contact with the disk medium 502a as the clamping fasteners (see, e.g., screw 207 of FIG. 2) are tightened and the contact forces are entirely concentrated on the outer contact of outer protrusion 406o. Then as the fasteners are further tightened the disk clamp 406 begins to deform and the inner protrusion 406i is brought into contact with the disk medium 502a, at which point the effective contact force of the inner and outer protrusions 406i, 406o begin to move from the outer diameter (OD) toward the inner diameter (ID) and continue to move inward as the fasteners are tightened further. Furthermore, as the inner contact axial offset h increases and the effective contact force moves from the inner contact of inner protrusion 406i toward the outer contact of outer protrusion 406o, the equivalent contact radius of the two contacts likewise moves from an inner radius toward an outer radius.

To inhibit coning of the top disk medium 502a, as can be modeled and/or measured by the OD-to-ID axial difference, the contacts and thus the inner and outer protrusions 406i, 406o need to be a sufficient distance apart, such as greater than 0.8 mm (millimeters) apart (i.e., d>0.8 mm) for a non-limiting example and according to an embodiment. Effectively, the force concentration (or "effective force") moves toward the OD, or outboard, as h increases. However, as the radial distance d increases, the contact forces show a lower sensitivity to the axial offset h. With respect to the coning of the middle disks (the disks other than the end disks), an effective contact radius at a 50% offset of the disk spacers 503 for a nominal torque load, i.e., at the mid-radius or halfway point between the ID and OD of the spacers 503, has been found to produce a tolerable and optimum coning deformation of the middle disks. Thus, while the distance d between the inner and outer protrusions 406i, 406o may vary from implementation to implementation and, therefore, d may represent an optimization goal, the effective radius of the force applied to the top disk medium 502a via the inner and outer protrusions 406i, 406o, based on the respective contact radii of the inner and outer protrusions 406i, 406o, should preferably be maintained at the spacer 503 mid-radius position for a nominal torque load, according to an embodiment.

Figure 6:
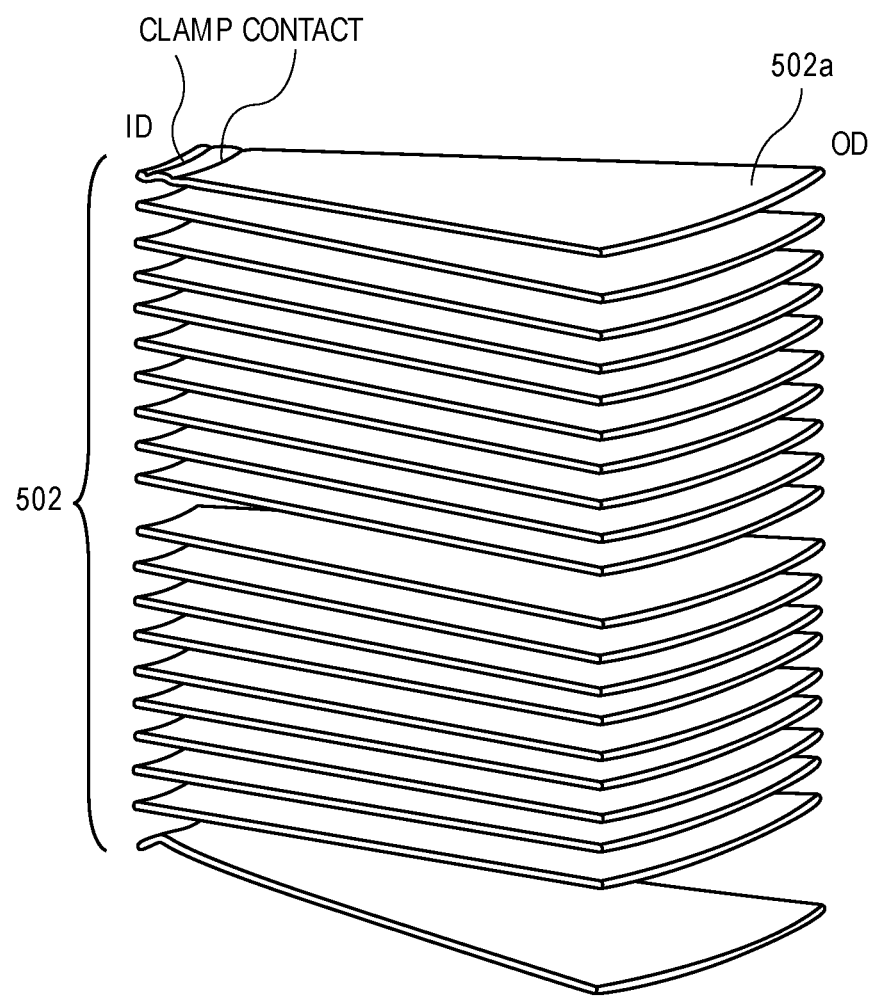
FIG. 6 is a perspective view illustrating the axial deformation of the recording disks in a disk stack with a multiple contact disk clamp under a moderate screw load, according to an embodiment.

FIG. 6 is a perspective view illustrating the axial deformation of the recording disks in a disk stack with a multiple contact disk clamp under a moderate screw load, according to an embodiment. To maintain clarity, FIG. 6 is a depiction of just a sliver of the disk media 502 of disk stack (e.g., a 30° sliver of the disk stack is depicted here, rather than the full 360° of the disk stack), showing how the disk media 502 are likely to deform under a nominal or designated clamping load (i.e., screw tension loads) from the multiple-contact disk clamp 406 (FIGS. 4A-5). Note here how the top or clamp-facing, clamp-contacting disk medium 502a minimally or negligibly deforms under the clamping load outward of where the disk clamp 406 is in contact with the disk medium 502a. In this example 2-inch HDD design, the coning is significantly better than that illustrated in FIG. 3 for a single-contact disk clamp.

Method for Coupling Disk Media to Spindle

Figure 7:
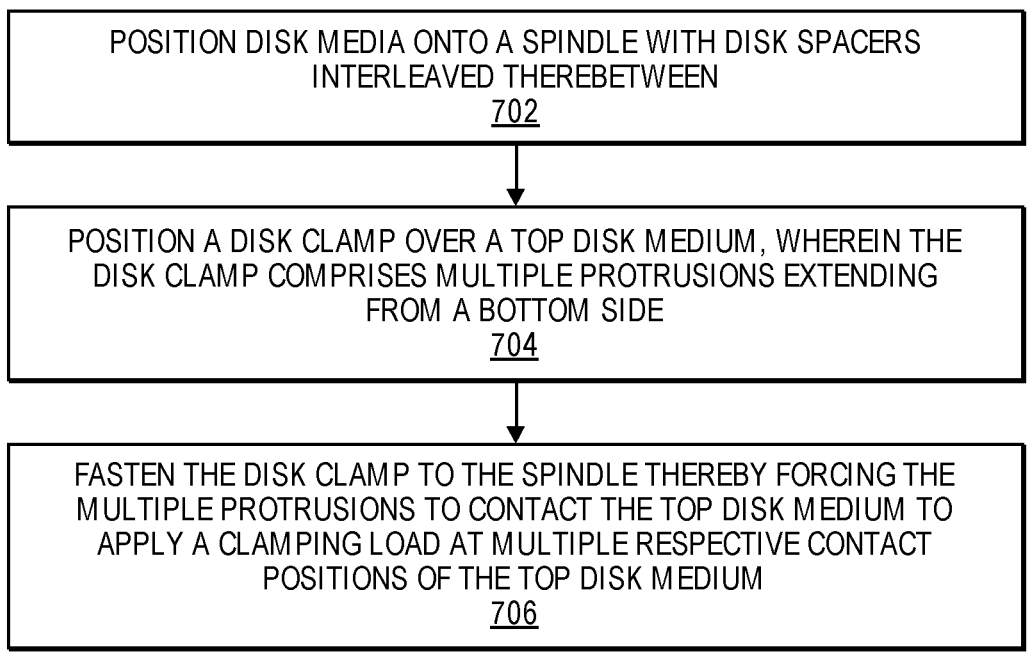
FIG. 7 is a flow diagram illustrating a method for coupling disk media to a spindle, according to an embodiment.

FIG. 7 is a flow diagram illustrating a method for coupling disk media to a spindle, according to an embodiment. For example, the method of FIG. 7 can be used in conjunction with embodiments of disk clamp(s) illustrated and described in reference to FIGS. 4A-5.

At block 702, position the disk media onto the spindle with disk spacers interleaved therebetween. For example, disk media such as disk media 202 (FIG. 2) are positioned onto the hub of a spindle such as spindle 204 (FIG. 2), with disk spacers 203 (FIG. 2), 503 (FIG. 5) interleaved between each pair of adjacent disk media.

At block 704, position a disk clamp over a top disk medium, where the disk clamp comprises multiple protrusions extending from a bottom side. For example, multiple contact disk clamp 406 (FIGS. 4A-5) having an inner protrusion 406i and an outer protrusion 406o is positioned onto the spindle 204 over the group of disk media 202 and interleaved disk spacers 203, i.e., the disk stack, and in contact with the top disk medium 502a (FIG. 5).

At block 706, fasten the disk clamp to the spindle thereby forcing the multiple protrusions to contact the top disk medium to apply a clamping load at multiple respective contact positions of the top disk medium. For example, fasteners such as threaded screws 207 (FIG. 2) are tightened to fasten the disk clamp 406 to the spindle 204 thereby forcing the multiple protrusions 406i, 406o to contact the top disk medium 502a to apply a clamping load at multiple respective contact positions of the top disk medium 502a, where the contact positions (or contact points, contact areas, contact surfaces) correspond to the contact from protrusions 406i, 406o. Consequently the top disk medium 502a is minimally or negligibly deformed or coned under the clamping load outward of where the disk clamp 406 having multiple protrusions 406i, 406o is in direct contact with the disk medium 502a, such as illustrated in FIG. 6.

Multiple Contact Disk Spindle Motor Hub Flange

A multiple contact disk spindle motor hub flange for a hard disk drive (HDD) includes multiple contact points or surfaces (generally, "contacts") between the hub flange and the bottom disk (e.g., an end disk), where an inner contact and an outer contact are radially offset and the inner contact is intentionally axially offset from the outer contact through an optimization process. Such an optimization process is intended to determine the optimum offset for the inner contact that keeps the bottom disk relatively, substantially flat and also produces an equivalent contact force of the two contacts substantially at the mid-radius (or "halfway") of the spacers between the disks. Stated otherwise, the optimized disk spindle motor hub flange of the described embodiments is intended to inhibit the coning of the bottom disk with which the hub flange is in contact, while also inhibiting the coning of the middle disks, i.e., the disks other than the end disks.

Figure 8:
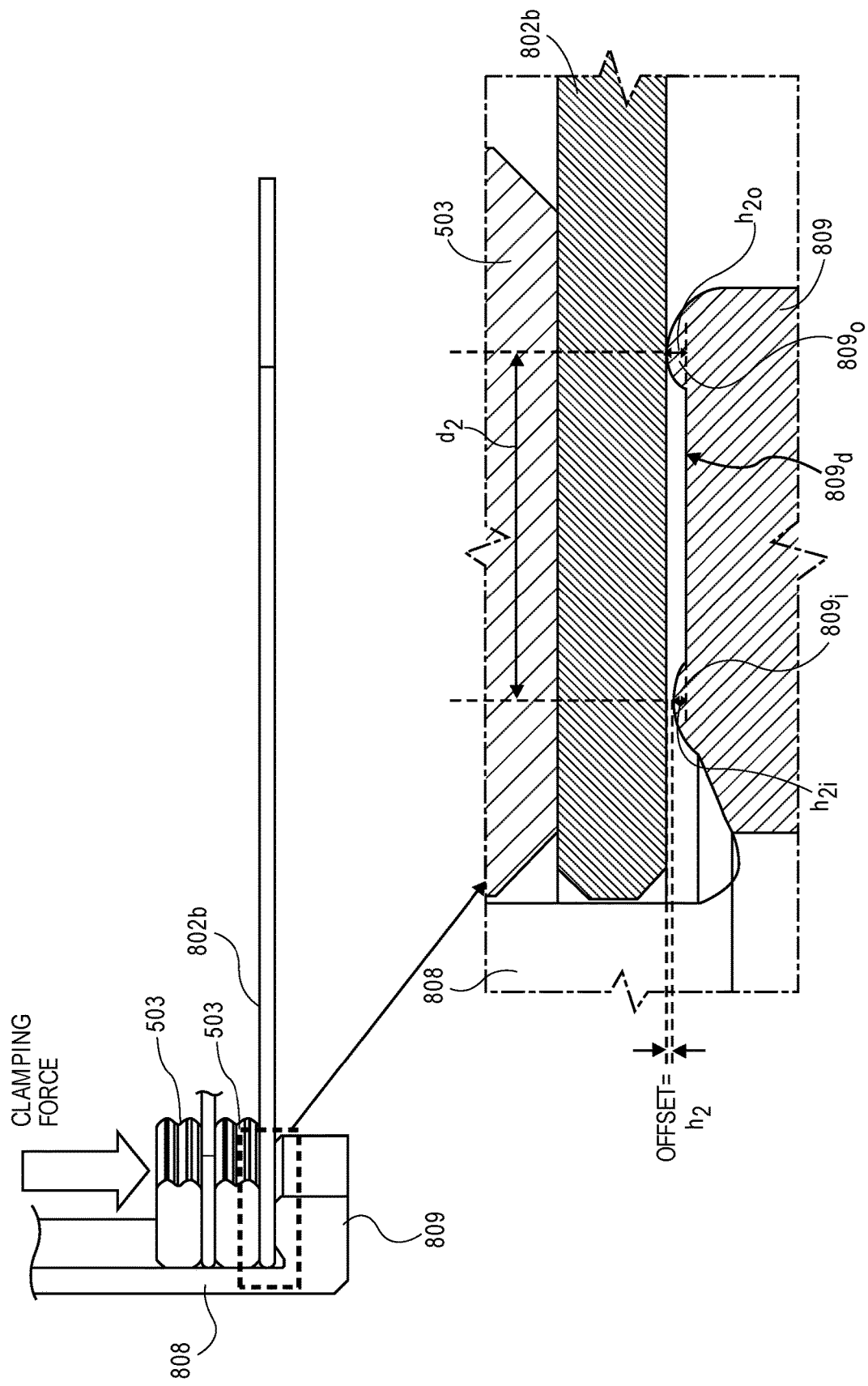
FIG. 8 is a magnified cross-sectional view illustrating design geometry for a multiple contact disk spindle motor hub flange, according to an embodiment.

FIG. 8 is a magnified cross-sectional view illustrating design geometry for a multiple contact disk spindle motor hub flange, according to an embodiment. The top portion of FIG. 8 is an angled side view of the assembly, with the bottom magnified portion of FIG. 8 being a cross-sectional side view. As previously introduced, hub flange 809 is preferably designed to optimize the axial offset (e.g., vertical, in context of the view of FIG. 8) for the inner contact corresponding to inner protrusion 809*i* relative to the outer contact corresponding to outer protrusion 809*o*, that keeps the bottom disk medium 802*b* substantially flat, or relatively flat in the context of comparing FIG. 9 (with dual-contact hub flange 809) with FIG. 3 (single-contact hub flange such as 209 of FIG. 2). Hub flange 809 comprises a disk-facing side 809*d* (or "top side") and a base-facing side 806*b* (or "top side"), and multiple protrusions 809*i*, 809*o* extending from a surface of the disk-facing side 809*d*. Two protrusions 809*i* (inner), 809*o* (outer) are depicted here and found suitable for the described purpose, however, the number of protrusions may vary from implementation to implementation. The protrusions 809*i*, 809*o* are configured to contact a disk medium such as end or bottom disk medium 202*b*, 802*b* (FIGS. 2, 8) in response to application of a clamping load (or clamping force), such as by way of a series of circumferentially-spaced fasteners or screws (see, e.g., screw 207 of FIG. 2), at multiple respective contact positions of the disk medium. According to an embodiment, each of the protrusions 809*i*, 809*o* is configured as an annular protrusion circumscribing the hub 808 and/or hub flange 809 of the spindle.

The inner protrusion 809*i* has a first height at its centerline ("center height $h_{2i}$") and the outer protrusion 809*o* has a second center height $h_{2o}$, where the first center height $h_{2i}$ of inner protrusion 809*i* is less than the second center height $h_{2o}$ of outer protrusion 809*o*, with this axial offset referred to as offset $h_2$ ($h_2 = h_{2o} - h_2$). The parameter $h_2$ may vary from implementation to implementation and indeed is expected to vary based on specific design configurations and, therefore, represents an optimization goal. For example, if the inner contact axial offset is zero ($h_2 = 0$ mm) then the contact forces are entirely concentrated on the inner contact of inner protrusion 809*i*, as the outer protrusion 809*o* loses contact with the disk medium as the clamping load is applied by tightening the fasteners. By utilizing an offset $h_2$, the inner protrusion 809*i* is initially not in contact with the disk medium 802*a* as the clamping fasteners (see, e.g., screw 207 of FIG. 2) are tightened and the contact forces are entirely concentrated on the outer contact of outer protrusion 809*o*. Then as the fasteners are further tightened the hub flange 809 begins to deform and the inner protrusion 809*i* is brought into contact with the bottom disk medium 802*b*, at which point the effective contact force of the inner and outer protrusions 809*i*, 809*o* begin to move from the outer diameter (OD) toward the inner diameter (ID) and continue to move inward as the fasteners are tightened further. Furthermore, as the inner contact axial offset $h_2$ increases and the effective contact force moves from the inner contact of inner protrusion 809*i* toward the outer contact of outer protrusion 809*o*, the equivalent contact radius of the two contacts likewise moves from an inner radius toward an outer radius.

To inhibit coning of the bottom disk medium 802*b*, as can be modeled and/or measured by the OD-to-ID axial difference, the contacts and thus the inner and outer protrusions 809*i*, 809*o* need to be a sufficient distance apart, such as greater than 0.8 mm (millimeters) apart (i.e., $d_2 > 0.8$ mm) for a non-limiting example and according to an embodiment. Effectively, the force concentration (or "effective force") moves toward the OD, or outboard, as $h_2$ increases. However, as the radial distance $d_2$ increases, the contact forces show a lower sensitivity to the axial offset $h_2$. With respect to the coning of the middle disks (the disks other than the end disks), an effective contact radius at a 50% offset of the disk spacers 503 for a nominal torque load, i.e., at the mid-radius or halfway point between the ID and OD of the spacers 503, has been found to produce a tolerable and optimum coning deformation of the middle disks. Thus, while the distance $d_2$ between the inner and outer protrusions 809*i*, 809*o* may vary from implementation to implementation and, therefore, $d_2$ may represent an optimization goal, the effective radius of the force applied to the bottom disk medium 802*b* via the inner and outer protrusions 809*i*, 809*o*, based on the respective contact radii of the inner and outer protrusions 809*i*, 809*o*, should preferably be maintained at the spacer 503 mid-radius position for a nominal torque load, according to an embodiment.

Figure 9:
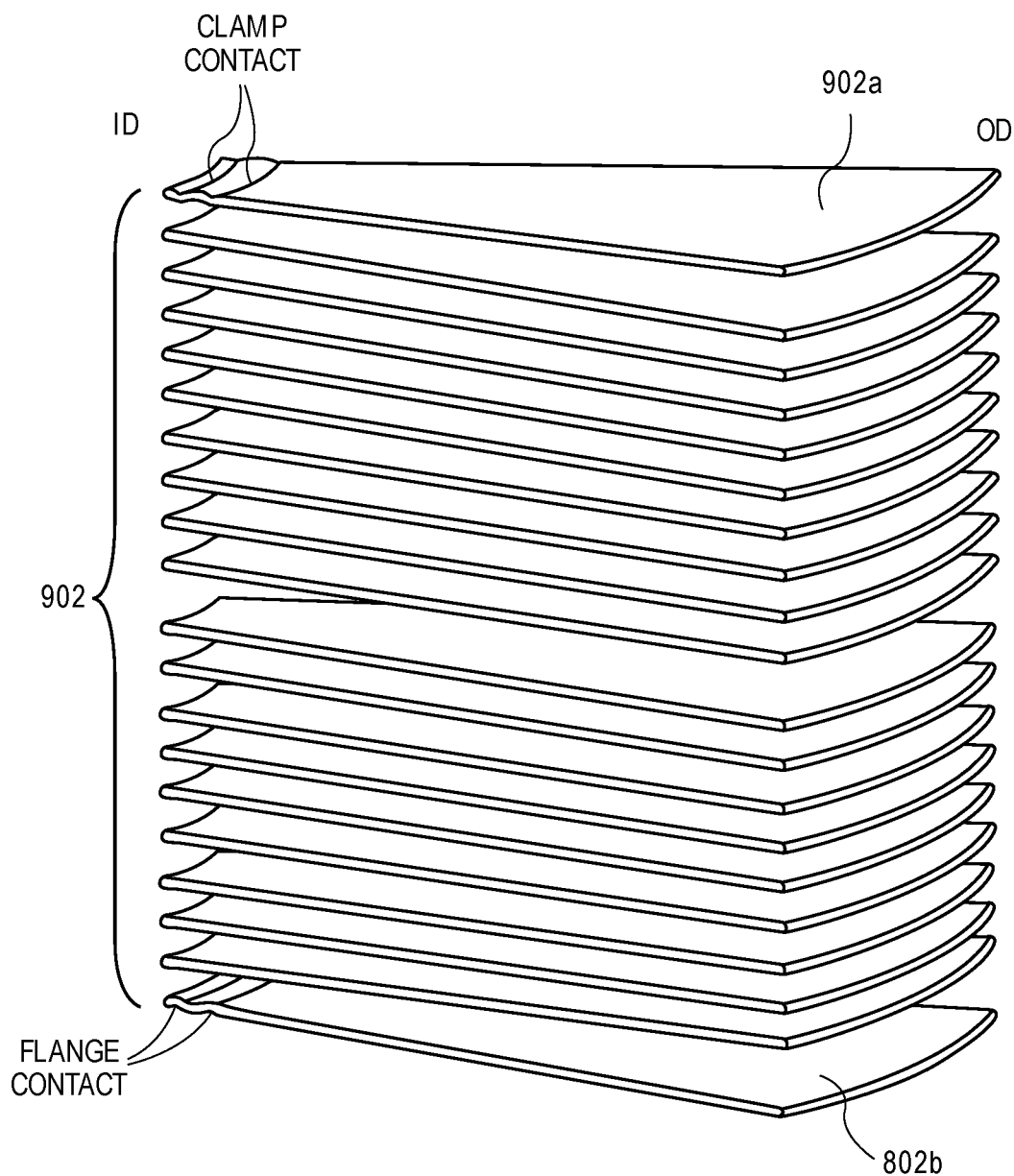
FIG. 9 is a perspective view illustrating the axial deformation of the recording disks in a disk stack with a multiple contact disk clamp and spindle motor hub flange under a moderate screw load, according to an embodiment.

FIG. 9 is a perspective view illustrating the axial deformation of the recording disks in a disk stack with a multiple contact disk clamp and spindle motor hub flange under a moderate screw load, according to an embodiment. To maintain clarity, FIG. 9 is a depiction of just a sliver of the disk media 902 of disk stack (e.g., a 30° sliver of the disk stack is depicted here, rather than the full 360° of the disk stack), showing how the disk media 902 are likely to deform under a nominal or designated clamping load (i.e., screw tension loads) from the multiple-contact disk clamp 406 (FIGS. 4A-5). Note here how the bottom or flange-facing, flange-contacting disk medium 802*b* minimally or negligibly deforms under the clamping load outward of where the hub flange 809 (FIG. 8) is in contact with the bottom disk medium 802*b*. In this example 2-inch HDD design, the coning is significantly better than that illustrated in FIG. 3 for a single-contact disk clamp and a single-contact hub flange, with respect to both the bottom disk medium 802*b* as well as the top disk medium 902*a*.

Method for Coupling Disk Media to Spindle

Figure 10:
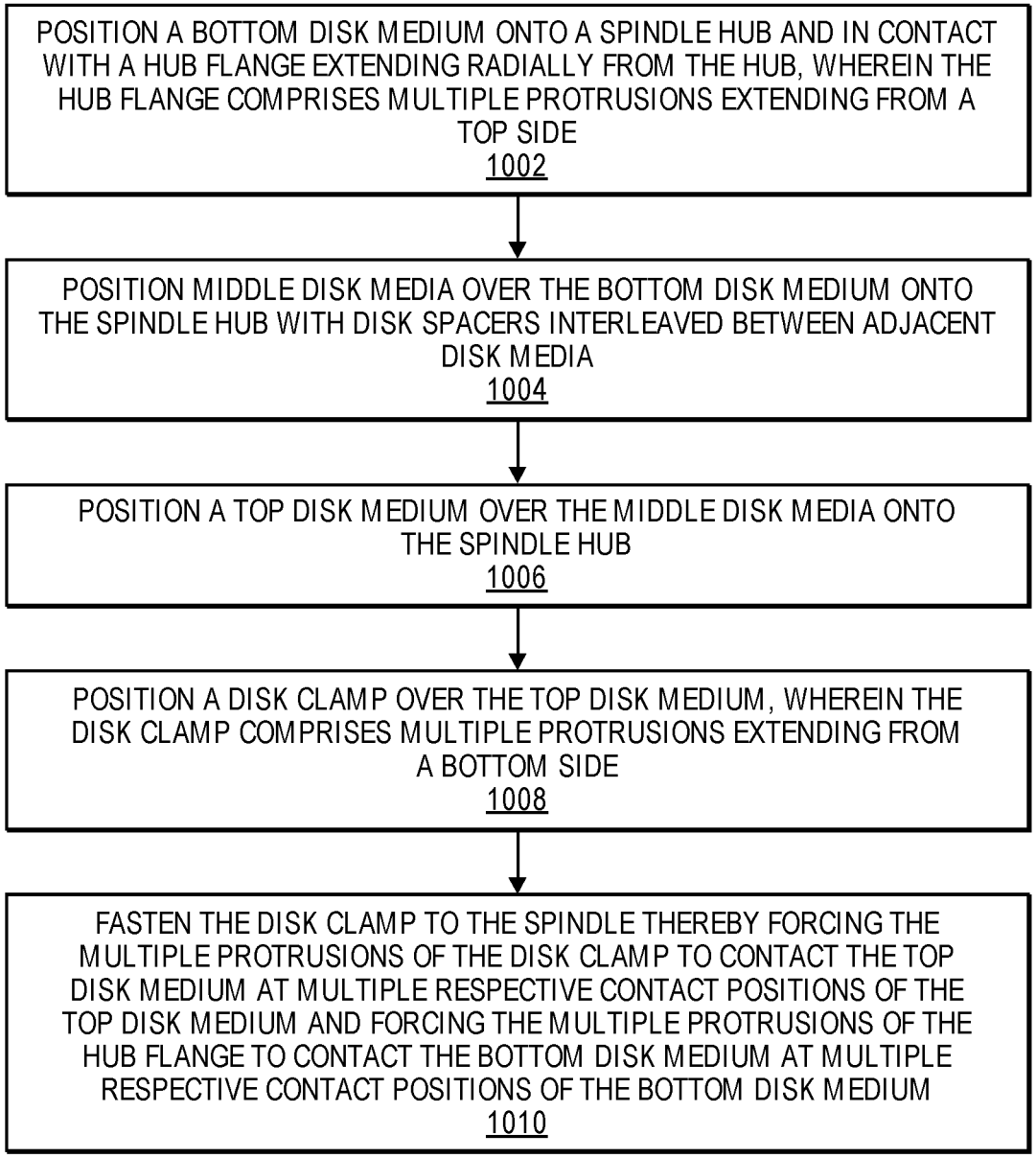
FIG. 10 is a flow diagram illustrating a method for coupling disk media to a spindle, according to an embodiment.

FIG. 10 is a flow diagram illustrating a method for coupling disk media to a spindle, according to an embodiment. For example, the method of FIG. 10 can be used in conjunction with embodiments of disk spindle hub flange(s) illustrated and described in reference to FIG. 8, and is described in reference to FIGS. 8-9.

At block 1002, position a bottom disk medium onto a spindle hub and in contact with a hub flange extending radially from the hub, where the hub flange includes multiple protrusions extending from a top side. For example, a disk medium such as disk media 802*b* (FIG. 8) is positioned onto the hub of a spindle such as hub 808 (FIG. 8).

At block 1004, position middle disk media over the bottom disk medium onto the spindle hub with disk spacers interleaved between adjacent disk media. For example, middle disk media such as disk media 902 (FIG. 9) other than the top and bottom (end) disks 902*a*, 802*b*, are positioned onto the hub 808 over the bottom disk media 802*b*, with disk spacers 503 (FIG. 8) interleaved between each pair of adjacent disk media.

At block 1006, position a top disk medium over the middle disk media onto the spindle hub. For example, a disk medium such as disk media 902*a* (FIG. 9) is positioned onto the hub 808.

At block 1008, position a disk clamp over the top disk medium, where the disk clamp comprises multiple protrusions extending from a bottom side. For example, multiple contact disk clamp 406 (FIGS. 4A-5) having an inner protrusion 406*i* and an outer protrusion 406*o* is positioned onto the hub 808 over the group of disk media 902 (including top disk medium 902a and bottom disk medium 802b) and interleaved disk spacers 503 (i.e., the disk stack) and in contact with the top disk medium 902a.

At block 1010, fasten the disk clamp to the spindle thereby forcing the multiple protrusions of the disk clamp to contact the top disk medium at multiple respective contact positions of the top disk medium and forcing the multiple protrusions of the hub flange to contact the bottom disk medium at multiple respective contact positions of the bottom disk medium. For example, fasteners such as threaded screws 207 (FIG. 2) are tightened to fasten the disk clamp 406 to the spindle 204 thereby forcing the multiple protrusions 406i, 406o of disk clamp 406 to contact the top disk medium 902a at multiple respective contact positions of the top disk medium 902a, where the contact positions (or contact points, contact areas, contact surfaces) correspond to the contact from protrusions 406i, 406o, and thereby also forcing the multiple protrusions 809i, 809o of hub flange 809 to contact the bottom disk medium 802b at multiple respective contact positions of the bottom disk medium 802b, where the contact positions (or contact points, contact areas, contact surfaces) correspond to the contact from protrusions 809i, 809o. Consequently the top disk medium 902a and the bottom disk medium 802b are minimally or negligibly deformed or coned under the clamping load outward of where the disk clamp 406 having multiple protrusions 406i, 406o is in direct contact with the top disk medium 902a and outward of where the hub flange 809 having multiple protrusions 809i, 809o is in direct contact with the bottom disk medium 802b, such as illustrated in FIG. 9.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
a plurality of disk media rotatably mounted on a spindle hub;
a plurality of disk spacers each interposed between adjacent disk media of the plurality of disk media;
a disk clamp coupled to the spindle and applying a clamping force to the disk media and the disk spacers to secure the disk media to the spindle hub, the disk clamp comprising:
a disk-facing side and a cover-facing side, and
multiple protrusions extending from a surface of the disk-facing side and in contact with a disk medium of the plurality of disk media, thereby applying the clamping force at multiple respective contact locations on the disk medium;
wherein:
each of the multiple protrusions comprises an annular protrusion circumscribing a hub of the disk clamp, and
the multiple protrusions comprise an inner annular protrusion having a first center height and an outer annular protrusion having a second center height greater than the first center height;
a plurality of head sliders each housing a read-write transducer configured to read from and to write to a respective disk medium; and
an actuator configured for moving the head sliders to access portions of the disk media.

2. The HDD of claim 1, wherein the multiple protrusions consist of the inner and the outer annular protrusions.

3. The HDD of claim 1, wherein:
the inner and outer annular protrusions are positioned so that an equivalent contact radius corresponding to contact radii of the inner and outer annular protrusions is at a position substantially halfway between an inner diameter and an outer diameter of the disk spacers to inhibit coning of middle disk media other than the disk medium.

4. The HDD of claim 1, wherein:
a distance between the contact radii of the inner and outer annular protrusions is greater than 0.8 millimeters to inhibit coning of the disk medium.

5. A disk clamp part for a hard disk drive, the disk clamp configured to clamp disk media to a spindle, the disk clamp comprising:
a bottom side and a top side, and
multiple protrusions extending from a surface of the bottom side and configured to contact a disk medium at multiple respective contact positions of the disk medium in response to application of a clamping load;
wherein:
each of the multiple protrusions comprises an annular protrusion circumscribing a hub of the disk clamp, and
the multiple protrusions comprise an inner annular protrusion having a first center height and an outer annular protrusion having a second center height greater than the first center height.

6. The disk clamp of claim 5, wherein the multiple protrusions consist of the inner and the outer annular protrusions.

7. The disk clamp of claim 5, wherein:
the inner and outer annular protrusions are positioned so that an equivalent contact radius corresponding to contact radii of the inner and outer annular protrusions is at a position substantially halfway between an inner diameter and an outer diameter of associated hard disk drive disk spacers.

8. The disk clamp of claim 5, wherein:
a distance between contact radii of the inner and outer annular protrusions is greater than 0.8 millimeters to inhibit coning of a mating recording disk.

9. A method for coupling disk media to a spindle, the method comprising:
positioning the disk media onto the spindle with disk spacers interleaved therebetween;
positioning a disk clamp over a top disk medium, wherein the disk clamp comprises multiple protrusions extending from a bottom side, wherein:
each of the multiple protrusions comprises an annular protrusion circumscribing a hub of the disk clamp, and
the multiple protrusions consist of an inner annular protrusion having a first center height and an outer annular protrusion having a second center height greater than the first center height; and
fastening the disk clamp to the spindle thereby forcing the multiple protrusions to contact the top disk medium to apply a clamping load at multiple respective contact positions of the top disk medium.

10. The method of claim 9, wherein:
the inner and outer annular protrusions are positioned so that an equivalent contact radius corresponding to contact radii of the inner and outer annular protrusions is at a position substantially halfway between an inner diameter and an outer diameter of the disk spacers to inhibit coning of middle disk media.

11. The method of claim 9, wherein:
a distance between contact radii of the inner and outer annular protrusions is greater than 0.8 millimeters to inhibit coning of the top disk medium.

* * * * *